(12) United States Patent
Lal (10) Patent No.: US 6,451,175 B1
(45) Date of Patent: Sep. 17, 2002

(54) METHOD AND APPARATUS FOR CARBON NANOTUBE PRODUCTION

(75) Inventor: Amit Lal, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 154 days.

(21) Appl. No.: 09/638,674

(22) Filed: Aug. 15, 2000

(51) Int. Cl.⁷ .................................................. B01J 19/08
(52) U.S. Cl. ............... 204/173; 423/445 B; 422/186.26
(58) Field of Search .................... 204/173; 422/186.26; 423/445 B (56) References Cited

U.S. PATENT DOCUMENTS

| | | |
|---|---|---|
| 3,134,011 A | 5/1964 | Bruyn |
| 3,210,586 A | 10/1965 | Clevett, Jr. |
| 3,337,728 A | 8/1967 | Friedman et al. |
| 3,555,235 A | 1/1971 | Darrow et al. |
| 3,614,373 A | 10/1971 | Skilling |
| 3,789,183 A | 1/1974 | Conley |
| 3,833,785 A | 9/1974 | Roach |
| 4,099,045 A | 7/1978 | Okuda et al. |
| 4,177,373 A | 12/1979 | Roen |
| 4,187,411 A | 2/1980 | Bryce et al. |
| 5,079,405 A | 1/1992 | Pierce |
| 5,110,405 A | 5/1992 | Sawabe et al. |
| 5,227,038 A | 7/1993 | Smalley et al. |
| 5,346,683 A | 9/1994 | Green et al. |
| 5,424,054 A | 6/1995 | Bethune et al. |
| 5,482,601 A | 1/1996 | Ohshima et al. |
| 5,541,382 A | 7/1996 | Taylor et al. |
| 5,648,056 A | 7/1997 | Tanaka |
| 5,676,860 A | 10/1997 | Muro et al. |
| 5,695,734 A | 12/1997 | Ikazaki et al. |
| 5,753,088 A | 5/1998 | Olk |
| 5,773,834 A | 6/1998 | Yamamoto et al. |
| 5,866,434 A | 2/1999 | Massey et al. |

OTHER PUBLICATIONS

E.G. Gamaly, et al., "Mechanism of Carbon Nanotube Formation in the Arc Discharge," Physical Review B, vol. 52, No. 3, Jul. 15, 1991, pp. 2083–2089.

D.T. Colbert, et al., "Growth and Sintering of Fullerene Nanotubes," Science, vol. 266, No. 5188, Nov. 18, 1994, pp. 1218–1222.

Primary Examiner—Kishor Mayekar
(74) Attorney, Agent, or Firm—Foley & Lardner (57) ABSTRACT

Carbon nanotubes are produced by depositing carbon material from an electrical arc established between a cathode and a carbon anode. A vibrational driver is coupled to the cathode to vibrate the cathode in a manner which enhances the proportion of carbon nanotubes deposited on the face of the cathode as compared to other carbon materials. The vibration of the cathode may also stabilize the arc to enhance the formation of longer nanotubes than are otherwise possible. The vibrational driver may also be operated to periodically apply a stress pulse of high amplitude to the cathode to dislodge the entire boule of carbon materials which has been deposited on the cathode, allowing a new boule to be formed. In this manner, continuous production of nanotubes can be carried out without the need to periodically halt the arc process to remove carbon material from the cathode.

24 Claims, 4 Drawing Sheets

METHOD AND APPARATUS FOR CARBON NANOTUBE PRODUCTION

FIELD OF THE INVENTION

This invention pertains generally to the field of carbon nanotubes and production processes for carbon nanotubes.

BACKGROUND OF THE INVENTION

Carbon nanotubes are crystalline tubular forms of carbon. They are closely related to the $C_{60}$ molecules known as fullerenes. The diameters of typical carbon nanotubes range from 10 nanometers (nm) for tubes with a single wall of carbon to 100 nm for tubes with several walls of carbon. Typical tube lengths are from 1 to 10 microns.

Carbon nanotubes have a number of significant potential applications. The high aspect ratio of the nanotubes makes them an ideal candidate for use in nanoprobing. For example, a nanotube having a tip diameter of 10 nm and a length of several microns may be used as the tip of an atomic force microscope to probe deep crevices found on integrated circuits (e.g., a 0.1 micron wide gate surrounded by 2 micron interconnects), nanostructures, and biological molecules. Carbon nanotubes also have exceptional material properties. The mechanical strength of nanotubes are predicted to be two orders of magnitude higher than that of conventional carbon fibers used in carbon-fiber composite materials. The much greater mechanical strength of the nanotubes originates in the crystallinity of the fiber as compared to the amorphous nature of a normal carbon fiber. The utilization of nanotubes in composites now using conventional carbon fibers can thus yield much lighter and stronger composite materials well suited for applications in the defense, aerospace and automobile industries.

The electrical properties of carbon nanotubes are also highly tunable. he tubes can be changed from semimetallic to semiconductive by changing the tube chirality (the handedness of rotation of the molecular structure of the tubes) or by doping the tubes with impurity atoms. Conceivably, nanoscale electronic circuits can be made on a single nanotube.

Nanotubes are typically produced in a carbon arc, similar to that utilized for production of fullerenes. A metal cathode and a carbon anode are initially contacted to start the arc and are then pulled apart to a distance of about 1 mm. The electrodes are typically maintained in an inert gas environment, e.g., helium at 500–700 torr pressure. The high current across the resistivity of the plasma results in heat generation of hundreds of watts in the small volume between the arc electrodes. The cathode and the enclosure for the arc are typically water cooled to avoid damage to these structures. The current densities required to produce nanotubes are typically in the range of 190 $A/cm^2$, with a typical voltage drop across the arc of about 20 volts. For a typical cathode diameter of ⅛ inch, about 250–300 watts of energy is dissipated. This energy is lost thermally via radiation and by melting the carbon on the anode and the cathode. The temperatures in the arc may be 4,000 K or even higher. As a result of these high temperatures, carbon vaporizes at the anode and is carried over to the cathode, where nanotube formation takes place. Over time, a boule of carbonaceous material is formed at the cathode which contains nanotubes. The structure of the boule is highly fractal, that is, it consists of macrobundles which contain microbundles, which in turn contain the nanotubes. To isolate the nanotubes, it is necessary to crush the boule and purify the nanotubes through chemistry, filtration and carbon oxidation. The last process can also be used to thin multi-wall nanotubes.

While for many applications it would be desirable to have nanotubes with lengths of 0.1 mm to 1 mm or greater, the most common nanotube lengths produced using conventional processing are about 1 micron long. In addition, most of the carbon material deposited on the cathode is non-nanotube amorphous carbon material. Consequently, a significant problem with current nanotube production techniques is that the lengths and the yield of nanotubes is very limited, and the cost of production of the nanotubes is very high, significantly limiting the practical applications of the nanotubes produced by conventional processes. Various approaches have been proposed for improving nanotube production, including rotating the cathode and scraping the carbon material off of the rotating cathode, as described in U.S. Pat. No. 5,482,601 to Ohshima, et al. Another approach has been to avoid the problems associated with arcs in gas atmospheres by immersing the arc in liquid nitrogen or other inert liquid as described in U.S. Pat. No. 5,753,088. Significant improvements in production efficiencies and tube lengths are still needed. The major limiting problems in such nanotube arc processes are the excessive production of other non-nanotube carbonaceous materials and arc instabilities. The first factor limits the yield of nanotubes from the production process and the second factor is believed to limit the length of the tubes that are produced.

SUMMARY OF THE INVENTION

In accordance with the present invention, the economy and efficiency of production of carbon nanotubes can be significantly increased while allowing for the formation of carbon nanotubes having longer lengths than have been obtained in conventional production processes. The production process may be carried out to increase the relative abundance of carbon nanotubes in the carbon material deposited on the cathode with respect to non-nanotube carbon material as compared to conventional processes, both enhancing the rate of production of carbon nanotubes as well as reducing the effort required to separate the nanotubes from other carbon material that is incidentally produced during the process. Further, the process may be carried out substantially continuously without requiring periodic and labor intensive halting of the production process to remove carbon materials from the electrodes.

The present invention may be carried out utilizing a cathode and a carbon anode mounted together within an enclosure in a conventional manner. An electrical power supply is connected to the anode and cathode to supply arc current. The arc may be established in a conventional manner by contacting the anode and cathode to initiate conduction and then drawing the faces of the anode and cathode away from each other to a satisfactory gap distance while maintaining the arc. In the present invention, a vibrational driver, such as a piezoelectric drive, is coupled to the cathode. In carrying out the present invention, the vibrational driver is activated to vibrate the cathode while the arc is established between the anode and cathode. Under suitable conditions, the cathode may be vibrated at frequencies from about 10 Hz to about 1 MHz or higher. The cathode is preferably vibrated at ultrasonic frequencies, for example, in the range of 10 kHz to 100 kHz. The driver may be operated at the resonant frequency of the cathode and its support to maximize the amplitude of longitudinal mode vibrations (vibrations perpendicular to the plane of the face of the cathode). The vibration of the cathode results in high accelerations of the face of the cathode to dislodge the larger, non-nanotube amorphous particles from the face surface while allowing the lighter carbon nanotubes to remain attached to the surface, thus enhancing the proportion of carbon nanotubes retained on the cathode face as compared to other carbon material. The vibration of the cathode face also results in acoustic streaming to thereby focus the plasma at the face surface. The vibration of the cathode may also be carried out to develop vibrational nodes and antinodes on the face of the cathode, allowing arc current to be focused and stabilized in location at the antinodes of cathode vibration, which enhances the formation of longer nanotubes.

Further in accordance with the invention, substantially all of the particles on the cathode face may be driven off by applying a stress pulse from the driver to the cathode which has a sufficient amplitude to dislodge the entire carbon boule from the face of the cathode. This creates new space for another nanotube boule to be formed. In this manner, continuous carbon nanotube production can be achieved which is limited only by the anode carbon supply, eliminating the need to stop the process to dislodge the carbon from the face of the cathode or to rotate the cathode or otherwise scrape the cathode to remove the carbon boule. Avoiding the need to scrape the cathode also avoids the mechanical damage to the cathode that can be caused by scraping.

The vibrational driver may be connected to a support rod at a position either inside or outside of the arc enclosure. If the driver is connected to the rod outside the enclosure, the support rod then extends through a wall of the enclosure to be connected to the cathode. Vibrations are coupled from the vibrational driver to the support rod and therethrough to the cathode. Coolant may be supplied through the support rod to the cathode to cool the cathode and maintain it at a desired temperature for optimal nanotube production.

Further objects, features and advantages of the invention will be apparent from the following detailed description when taken in conjunction with the accompanying drawings.

DETAILED DESCRIPTION OF THE INVENTION

Figure 1:
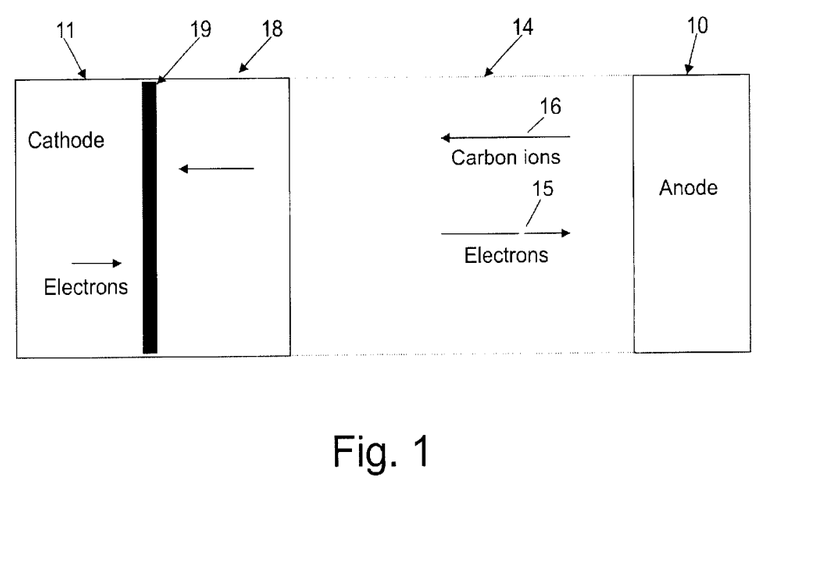
FIG. 1 is a schematic view showing the regions in the arc between the cathode and anode during carbon nanotube formation.
Figure 2:
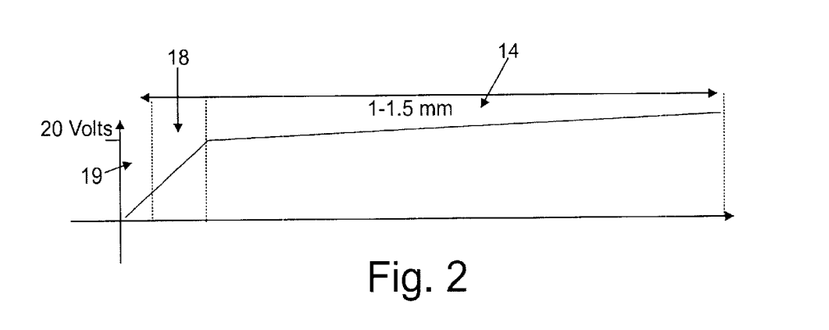
FIG. 2 is a diagram illustrating the potential drop across the arc between the cathode and anode of the type shown in FIG. 1.

An understanding of the present invention may be facilitated by consideration of the conditions under which the nanotubes are formed in the arc between a carbon anode 10 and a cathode 11 as illustrated in FIG. 1. Due to the plasma charge transport, three regions can be distinguished in the gap between the anode and the cathode. The first region 14 adjacent to the anode is a gap with travelling electrons 15 and carbon atoms 16 with little electric field. The second region 18 is a space charge region formed due to the presence of the carbon ions and electrons. The thickness of the space charge layer may be estimated to be typically about 12 microns, a value calculated from Child's formula. See, Y. P. Raizer, "Gas Discharge Physics," Springer-Verlag, Berlin, 1991. Most of the potential drop occurs across the space charge region. The last region 19 is a layer of boiling carbon ions adjacent the surface of the cathode 11, the thickness of which can be calculated to be approximately 1–3 microns. Because the density of carbon atoms is the highest in this last region, most of the reactions responsible for nanotube formation occur in this region. See, e.g., Gamaly, et al., "Mechanism of Carbon Nanotube Formation in the Arc Discharge," Physical Review B, Vol. 52, No. 3, Jul. 15, 1991, pp. 2083–2089.

The electrons hitting the anode 10 cause the release of carbon atoms from the anode surface by boiling and ablation; the released carbon atoms are accelerated first by the weak electric field between the anode 10 and the boundary of the space charge layer 18 and then by the high electric field in the space charge region 18. There are two sources of the carbon atoms in the region 19 adjacent the cathode. The first source is the carbon plasma formed by the high temperature at the surface of the cathode 11. The carbon ions in the carbon sheath plasma have a Maxwellian velocity distribution, i.e., they have no preferential direction. The second source of carbon is the carbon atoms arriving from the anode 10. These carbon atoms have a highly preferential velocity distribution which is mostly normal to the surface of the cathode 11. The high normal velocity is a result of the acceleration in the high electric field between the electrodes. The difference in directionality is believed to be essential in the formation of carbon nanotubes versus other carbonaceous material. See, e.g., Gamaly, et al., supra and Y. P. Raizer, supra. The incoming ions impact the cathode with high carbon density.

The arc current does not have a uniform current density. Pressure, temperature, and electric field variations on the current path result in highly focussed current distributions which lead to the nanotube formation. See, e.g., Gamaly, et al., supra and D. T. Colbert, et al., "Growth and Sintering of Fullerene Nanotubes," Science, Vol. 266, No. 5188, Nov. 18, 1994, pp. 1218–1222. In contrast, the omni-directional velocities of the plasma carbon atoms lead to the formation of clusters of carbon. Thus, one way to increase nanotube formation would be to decrease the density of the carbon plasma at the cathode. Supporting this hypothesis is the known fact that nanotube production and length increase by actively cooling a copper cathode (D. T. Colbert, et al., supra). The colder temperatures reduce the carbon plasma density, but also result in lower nanotube formation as reactions are exponentially dependent on temperature. It would thus be preferable to be able to decrease the local carbon plasma while maintaining the high cathode temperature. However, even if the problem of decreasing the local carbon plasma is solved, there still remains the problem of arc instability.

It is generally the case that arcs are very unstable. Slight differences in cathode potential or surface features will shift the locations of high current densities ("arc lines"). Because the nanotubes are formed at the locations of the current peaks, any shifts in these locations disrupts the formation process and limits the tube length. It would be ideal to stabilize the arc singularities such that they do not move. If the current beam could be focussed at one spot indefinitely, in principle, the process could continuously produce a nanotube.

The present invention may be carried out to address both the problem of the presence of carbon plasma which forms the non-nanotube carbonaceous material and instabilities of the arc current densities that limit nanotube length. In accordance with the present invention, these problems are significantly mitigated by vibrating the cathode, generally at frequencies from about 10 Hz to 1 MHz or higher, and preferably at ultrasonic frequencies typically in the range from 10 kHz to 100 kHz.

Figure 3:
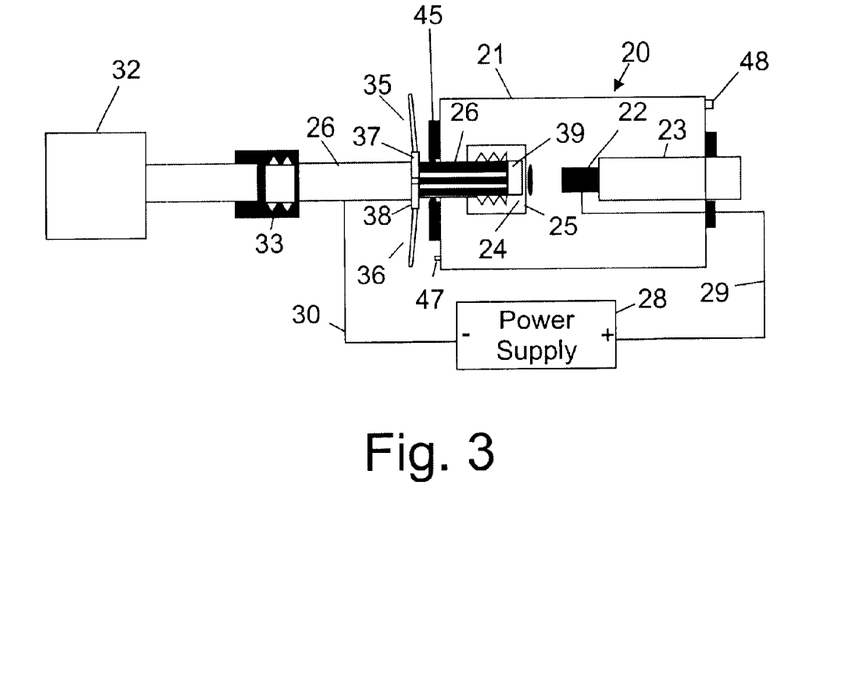
FIG. 3 is a schematic view of apparatus for producing nanotubes in accordance with the invention.
Figure 4:
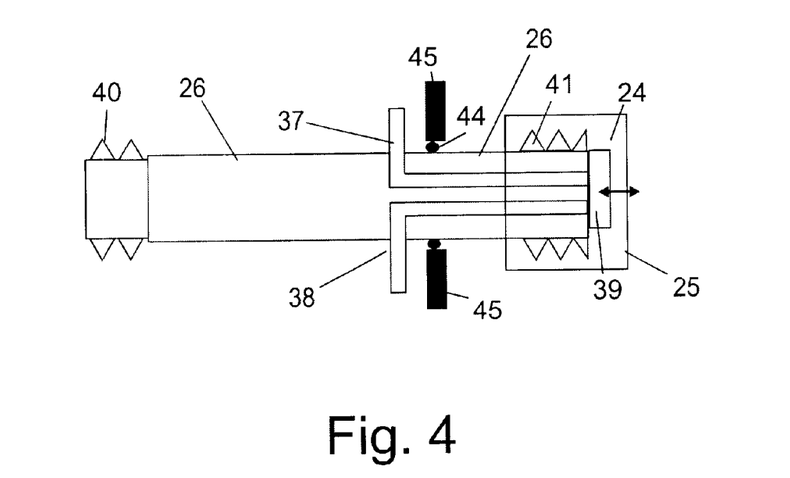
FIG. 4 is a more detailed view of the support rod coupled to the cathode in the apparatus of FIG. 3.

Apparatus for forming carbon nanotubes in accordance with the invention with vibration of the cathode is illustrated generally at 20 in FIG. 3. The apparatus 20 includes an enclosure 21 in which are mounted a carbon anode 22 on a linear actuator 23 and a metal (e.g., copper) cathode 24 on a support rod 26. A conventional electrical arc power supply 28 is connected by a power line 29 to the carbon anode 22 and by a power line 30 to the support rod 26 and thus to the cathode 24. A vibrational driver 32, e.g., a piezoelectric drive, is connected to the support rod 26 by an electrical insulating coupling 33 to couple mechanical vibrations from the driver 32 to the cathode 24, preferably driving the face 25 of the cathode in longitudinal displacement vibrations at high accelerations. Piezoelectric ceramics with high electromechanical coupling coefficient and high electric field tolerance are preferred vibrational drivers, although other types of drivers such as magnetostrictive and electromagnetic mechanisms may also be used. An example of a piezoelectric driver material is the lead zirconate titanate (PZT) family of piezoceramics, which are available commercially. Hoses 35 and 36 are preferably coupled to cooling water tubes 37 and 38 which extend to a hollow interior space 39 within the cathode cap 24 to provide coolant to and through the cathode (or alternatively through coils around the cathode) to cool the cathode and allow control of its temperature. Coils carrying water or other coolant (not shown) may be wrapped around the enclosure to cool it in a conventional fashion. As shown in the more detailed view of FIG. 4, the support rod 26 may be formed with threads 40 at one end to be threadingly engaged to the ultrasonic driver 32, and by threads 41 at its other end to be threaded to the cathode cap 24. The support 26 is preferably formed of a rigid metal material, e.g., titanium, that will effectively couple the mechanical vibrations from the ultrasonic driver 32 to the cathode cap 24 and to the face 25 of the cathode. As illustrated in FIG. 4, a seal 44 may be mounted around the support rod 26 and engaged with an opening in a wall 45 of the enclosure 21 to seal off the interior of the enclosure 21. A suitable inert gas (e.g., helium) may be introduced through a port 47 and a vacuum draw may be provided at a port 48 to maintain the atmosphere within the enclosure at the desired pressure of the inert gas. Although the ultrasonic driver is shown coupled to the support rod 26 outside the enclosure 21, it is understood that the driver may be mounted within the enclosure, with suitable protection from the heat of the arc if necessary.

The ultrasonic driving of the cathode results in very high accelerations of the tip face 25 of the cathode. Preferably, the cathode 24 and its support rod 26 are driven at their longitudinal mode resonant frequency to maximize longitudinal vibrations (displacements perpendicular to the normal plane of the typically flat face of the cathode). A suitable ultrasonic drive may provide a cathode tip displacement of 10 microns or more. For example, a peak-to-peak tip displacement of 50 microns at 27 kHz results in a cathode face acceleration of about 40,000 g's. Such accelerations result in large inertial forces acting on any particles on the surface of the cathode face 25. If these forces are greater than the binding forces of the particles to the surface, the particles will be dislodged and effectively whipped away from the surface. Because the inertial forces will be proportional to the mass of the particles, the larger particles are shaken off more easily than the lighter ones. The ultrasonic action will thus tend to maintain the lighter particles attached to the face 25 of the cathode, while the bigger carbon chunks, which generally will be amorphous, will be shaken off. Because the carbon nanotubes are generally lighter than the amorphous carbon particles, the nanotubes will thus be preferentially left behind and allowed to grow longer.

The longitudinal vibrational displacement of the face of the cathode is preferably greater than the thickness of the carbon plasma in the region 18, which can thus dissipate this plasma and thus reduce the proportion of randomly moving carbon ions that impact on the face of the cathode. To reduce the carbon vapor sheath, the cathode should move at least two to three times more than the thickness of the carbon vapor thickness, which is estimated to be ~2–3 microns. Hence, the vibration amplitude should be able to produce an estimated 4–6 microns of peak to peak displacements. The amplitude may be measured under a microscope by observing the region of blurring of the face of the cathode.

Figure 5:
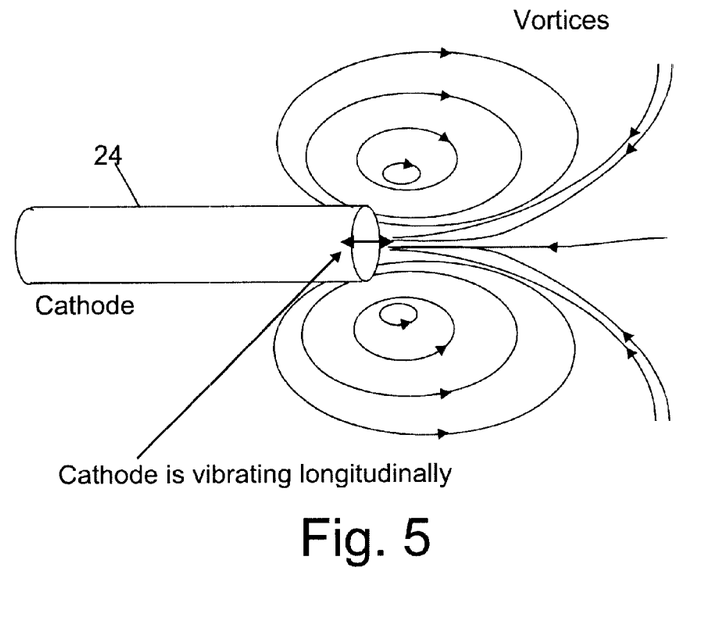
FIG. 5 is a schematic view illustrating the manner in which vibration of the cathode face produces gas vortices that can serve to stabilize the arc.

In accordance with the invention the arcs in which nanotubes are formed are stabilized as a result of inherent electrical and mechanical forces. Axial magnetic fields will tend to confine the ions due to Lorentz forces. Mechanical forces from blown air generated by vibration of the cathode will also tend to confine the arc to a smaller volume. For example, blown air is used in arc welders to consistently make fine welds along a predefined line, whereas without blown air the weld line is broad and will wander. It is known that high intensity ultrasonics at the end of a driven piston results in gas flow. The nonlinearity of the gas and the convective term in the Navier-Stokes equation which governs the process results in a steady flow from an acoustic time-varying field. This is due to a phenomenon that is called acoustic streaming. As illustrated in FIG. 5, a toroidally symmetric vortex flow in the gas adjacent to a driven cathode 24 will result when it is driven ultrasonically into a gas or liquid and will thereby enhance focussing of the plasma.

Figure 6:
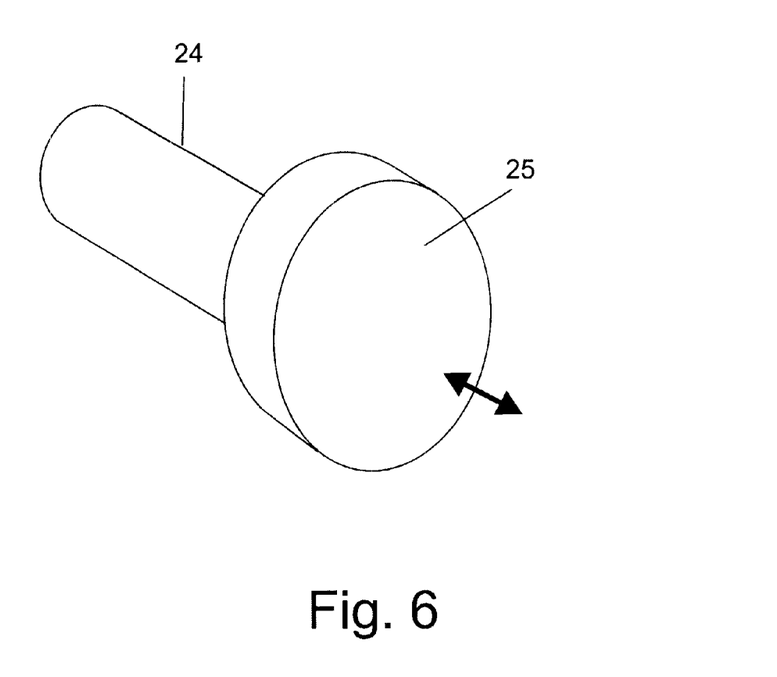
FIG. 6 is a schematic view illustrating vibration of a plate cathode.
Figure 7:
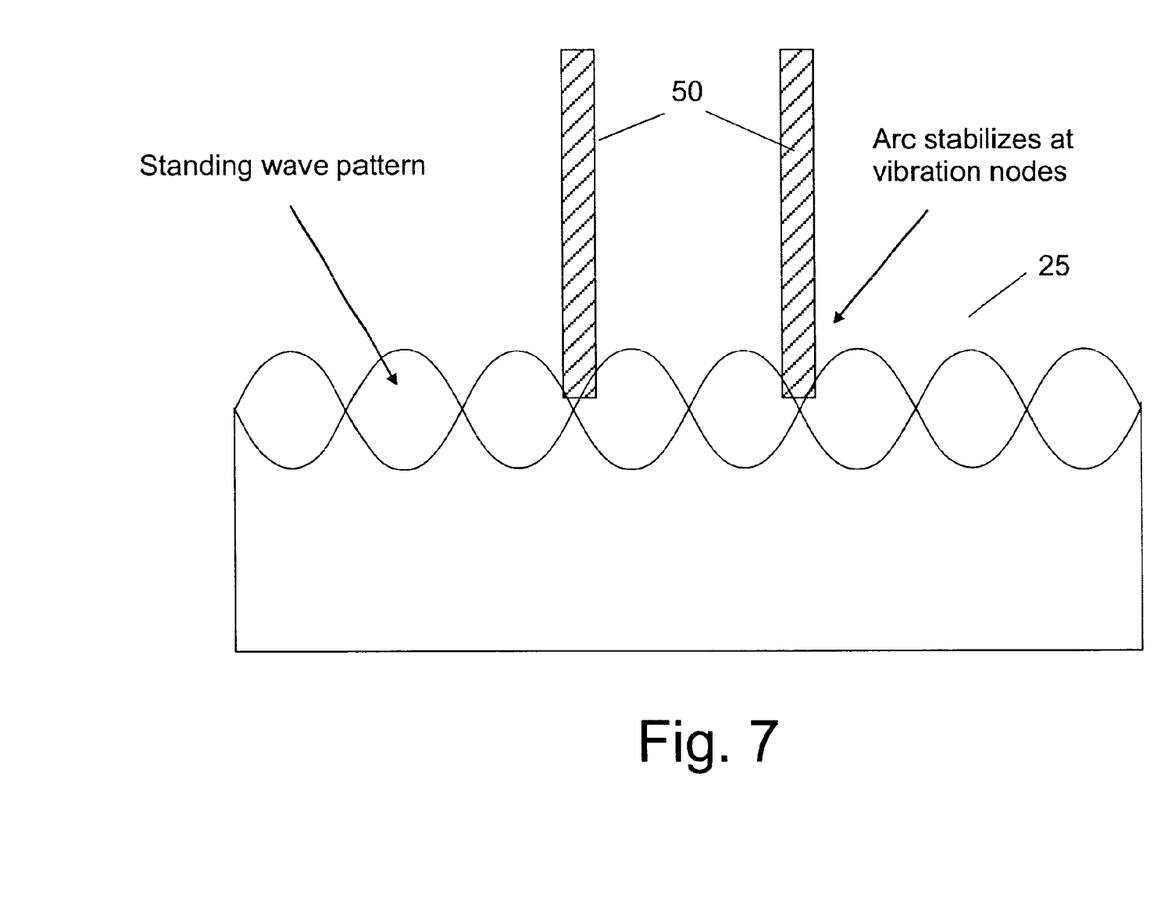
FIG. 7 is a simplified view illustrating standing wave patterns developed by vibration of a plate cathode of the type shown in FIG. 6.

In addition, vibrations induced in the cathode face surface 25 can act to stabilize the arc dynamics. An analogy is a parametrically driven inverted pendulum. When undriven, an inverted pendulum will stabilize by falling either on the left or right of the hinge on which it is supported. However, when the pendulum fulcrum is driven at twice its natural frequency, the inverted pendulum can be made to stand vertically in a stable position. Analogously, an electrical arc on a fixed cathode is free to move to the spots of lower potential energy on the face of the cathode. The ultrasonic driving of the cathode face results in a parametric drive of the high current peaks in the arc. Instead of wandering, they will be trapped in spots determined by the complex cathode-arc dynamics and the boundary conditions. For a cathode 24 having a relatively wide flat face 25, as illustrated in FIG. 6, standing wave pattern vibrational modes may be induced on the face of the cathode, as illustrated in FIG. 7. In this manner, the arc current may be stabilized so in location at the antinodes of cathode vibration, allowing longer nanotubes to be formed, as illustrated at 50 in FIG. 7.

The vibration frequency may be selected to give the best results for a particular arc apparatus. Generally, the frequency will be in the range of 10 Hz to 1 MHz, and sometimes higher, and typically in the range of 10 kHz to 100 kHz.

A hot cathode kept at, e.g., 4000 K results in a sheath of carbon vapor, which consists of carbon atoms with random particle velocities with no particular directional preference. The thickness of the carbon sheath is approximately 2–3 microns thick. (See Gamaly, supra.) By moving the cathode at ultrasonic frequencies, the carbon sheath can be reduced or eliminated by lowering the effective surface temperature due to the increased gas flow caused by acoustic streaming. The acoustic streaming results from gradients of acoustic energy in the fluid, which increase with increased frequency. Hence, as the frequency increases, while keeping vibration amplitude constant, increased flow for cooling the cathode is obtained.

Furthermore, as the cathode moves back and forth with displacement greater than the sheath thickness and at speeds greater than required to form the plasma, the surface plasma can be nearly eliminated. The plasma formation time is nearly 1 second, a value calculated by considering the time it takes to heat the carbon cathode to 4000 K. Moving the cathode away from the vapor drastically reduces the temperature of the vapor as it equilibrates with the surrounding helium, which is a very good thermal conductor. However, if the frequency of the oscillation is increased too high, the vapor will not equilibrate with the helium.

In accordance with the present invention, substantially all of the particles on the cathode face may be driven off by applying a stress pulse of high amplitude, a high amplitude impulse or high amplitude vibration of a selected pulse width, from the driver 32 through the coupling rod 26 to the cathode 24. A sufficiently high amplitude stress pulse will dislodge the entire carbon boule on the face 25 of the cathode, creating new space for another nanotube boule to form. Applying a pulse to the coupling rod 26 creates a compressional wave that impinges on the cathode face, where it reflects back as a tensile wave. The resulting tensile wave spalls off the boule. A fast risetime ultrasonic stress pulse can be generated by the fast risetime of an electrical pulse across the (e.g., piezoelectric ceramic) driver. To get fast risetime, a voltage source with high current capability is generally needed to deliver high peak current to the capacitive load of the piezoelectric driver.

An expression for the thicknesses $t_s$ of a segment spalled off for a bar made of homogeneous material is:

$$t_s = \left(\frac{\sigma_{cr}}{\sigma_0}\right)\left(\frac{c_{pulse} t_{pulse}}{2}\right)$$

where $\sigma_{cr}$ is the stress needed to break away the materials, $\sigma_0$ is the pulse peak stress, $t_s$ is the spalled materials thickness, $t_{pulse}$ is the pulse duration, and $c_{pulse}$ is the speed of the pulse, which is generally equal to the speed of sound in the material. For a given boule length, one can tune the pulse length and stress amplitude to spall effectively. However, since the bond strength of the carbon boule to the cathode and the material properties of the boule varies statistically, the system could be swept through various pulse amplitudes for a pulse of a given length until the boule spalls.

In this manner, continuous carbon nanotube production can be achieved that is limited only by the anode carbon supply by periodically applying a stress pulse to the cathode to dislodge the boule. It is not necessary to stop the arc process or to rotate the cathode or otherwise scrape the cathode to remove the carbon boule. Other vibration techniques may also be used to spall the carbon boule off the cathode. For example, the cathode may be driven at a frequency that excites a resonant mode of the boule of sufficient magnitude so that the shear stresses at the metal cathode/carbon interface result in boule detachment.

The temperature of the cathode and the region of the arc may be monitored and can be controlled by control of the flow of coolant (e.g., liquid water) from the hoses 35 and 36 to the cathode. Because of the effects of vibration of the cathode in accordance with the invention, higher operating temperatures may be used, allowing enhanced production rates. The temperature of the cathode is determined by the power dissipated by the electron current in the plasma. For example, if the voltage across the plasma is ~20 V, the current density is ~150 A/cm$^2$ and the cathode cross-sectional area is 0.1 cm$^2$, the total power dissipated as heat is ~300 Watts. This power heats the cathode and the helium gas. Heat is also lost by radiation at the high temperatures. The heat in minus the heat out, and the specific heat of the cathode material, determines the final temperature of the cathode . As noted above, the acoustic streaming resulting from the acoustic field in the helium results in increased flow of helium, which increases heat transfer and results in lower cathode temperature. The temperature can be measured using a pyrometer. The relative intensity of the plasma is also generally bright enough to be measured using a solar cell mounted at a window of the plasma chamber.

The effects of ultrasonic driving of the cathode and of the other variables on the arc and nanotube growth are summarized in Table 1 below.

TABLE 1

Arc parameters, physical effects, and influence on nanotube length and yield

| | Physical Effects | Tube Yield | Tube Length |
| --- | --- | --- | --- |
| Arc current | Affects cathode temperature and production rate | High currents will lead to high temperature plasma which will lead to higher non-nanotube particles. | High plasma density causes smaller nanotubes |
| Helium pressure | Affects ability to convect heat way from arc and effects reaction dynamics | Higher helium pressure allows faster cooling rates for plasma | High pressures stabilize plasma causing longer lengths |
| Cathode cooling | Low temperatures reduce the carbon plasma density | Reduction of plasma density leads to higher tube yield | Lower carbon density results in longer tubes |
| Ultrasonic drive | Affects arc stability, dispersion of cathode plasma density and gas flow | Shaking off of large particles will lead to continuous production of nanotubes | Longer tube lengths by arc stabilization and lower carbon plasma density |

As an example of the invention, nanotubes were formed utilizing the equipment of FIG. 3 by initially bringing the copper cathode electrode in contact with the carbon anode and passing a large current of 50 to 60 amps through the electrodes. After the arc was established, the electrodes were pulled apart by a distance of 3–5 mm. The voltage drop across the arc was about 20 volts, typical of carbon arcs. The arc glows brightly due to the emission from the carbon plasma at the cathode. The carbon nanotubes are found in the carbon boule which is deposited on the face 25 of the copper cathode 24. The ultrasonic actuator 32 was driven using a radio frequency (RF) amplifier. The resonant frequency of the longitudinal mode of the system composed of the cathode 24 and the coupling rod 26 was 27 kHz and the driver was operated at this frequency. The power input to the actuator could be controlled by changing the drive voltage to the amplifier. When the RF power was supplied to the driver, a substantial decrease in the arc glow intensity was observed. The glow could be modulated by increasing and decreasing the amplifier output, demonstrating that the plasma may be substantially reduced by driving the face of the cathode at amplitudes greater than the plasma/cathode separation of 10 microns. The carbon boules were periodically ejected in total off the face 25 of the copper anode 24 by applying a stress pulse of very high amplitude vibrations to the cathode, allowing continuous production of nanotubes on one cathode.

It is understood that the invention is not confined to the particular embodiments set forth herein as illustrative, but embraces all such forms thereof as come within the scope of the following claims.

What is claimed is:

1. A method of forming carbon nanotubes comprising:
   (a) establishing an electrical arc between a carbon anode and a cathode to deposit carbon material including carbon nanotubes onto the cathode; and
   (b) longitudinally vibrating the cathode while the arc is established between the anode and cathode and carbon material is deposited on the cathode.

2. The method of claim 1 wherein the cathode is vibrated at a frequency of at least 10 kHz.

3. The method of claim 1 wherein the cathode is vibrated at a frequency from 10 kHz to 100 kHz.

4. The method of claim 1 wherein the peak-to-peak amplitude of the vibration of the cathode is at least 6 $\mu$m.

5. The method of claim 1 further including the step of applying a stress pulse of higher amplitude than the amplitude at which the cathode has been vibrated while carbon material is deposited in the cathode to dislodge the deposited carbon material from the cathode.

6. The method of claim 1 wherein the step of establishing an electrical arc includes applying a voltage between the anode and cathode sufficient to maintain a current arcing across a gap between the anode and the cathode.

7. The method of claim 6 including maintaining the anode and cathode in an atmosphere of an inert gas.

8. The method of claim 1 wherein vibrating the cathode includes coupling a piezoelectric driver to the cathode and operating the piezoelectric driver to transmit mechanical vibrations to the cathode.

9. The method of claim 1 wherein the cathode has a flat face and wherein the step of vibrating the cathode is carried out to establish vibrational nodes and antinodes on the face of the cathode.

10. The method of claim 1 wherein the step of establishing an arc includes supplying a voltage between the anode and cathode and contacting the anode and cathode to begin the arc and then drawing the anode and cathode apart to a selected distance while maintaining the arc discharge.

11. The method of claim 1 including the step of controlling the temperature of the cathode to maintain a desired temperature.

12. A method of forming carbon nanotubes comprising:
   (a) establishing an electrical arc between a carbon anode and a cathode to deposit carbon material onto the cathode; and
   (b) selectively applying a stress pulse to the cathode of an amplitude sufficient to dislodge the carbon material deposited on the cathode.

13. The method of claim 12 wherein the step of applying a pulse to the cathode includes coupling a piezoelectric driver to the cathode and operating the piezoelectric driver to transmit mechanical vibrations to the cathode of an amplitude sufficient to dislodge carbon material from the cathode.

14. The method of claim 12 wherein the step of applying a pulse to the cathode is carried out periodically at selected times between which carbon material is deposited on the cathode.

15. Apparatus for forming carbon nanotubes comprising:
   (a) an enclosure enclosing a space which may be filled with an inert gas;
   (b) a carbon anode mounted in the enclosure;
   (c) a cathode mounted in the enclosure, the cathode and anode having faces that may be spaced from each other by a gap;
   (d) an electrical power supply connected to the anode and cathode to apply a voltage thereto to establish and maintain an electrical arc between the anode and cathode; and
   (e) a vibrational driver mechanically coupled to the cathode to longitudinally vibrate the cathode while electrical power is applied by the power supply to the anode and cathode.

16. The apparatus of claim 15 wherein the enclosure contains an atmosphere of an inert gas.

17. The apparatus of claim 15 wherein the vibrational driver comprises a piezoelectric drive located outside of the enclosure and a rod mechanically coupling the piezoelectric drive to the cathode to transmit mechanical vibrations from the piezoelectric drive to the cathode.

18. The apparatus of claim 15 wherein the vibrational driver provides vibrations to drive the cathode at a frequency of at least 10 kHz.

19. The apparatus of claim 15 wherein the vibrational driver provides vibrations to drive the cathode at a frequency from 10 kHz to 100 kHz.

20. The apparatus of claim 15 wherein the vibrational driver transmits vibrations to the cathode to vibrate the face of the cathode with a peak-to-peak amplitude of at least 6 $\mu$m.

21. The apparatus of claim 15 wherein the vibrational driver may be operated to apply selectively a mechanical stress pulse of an amplitude sufficient to dislodge carbon material from the face of the cathode.

22. The apparatus of claim 15 wherein the vibrational driver is coupled to a support rod which extends from a position outside of the enclosure through a wall of the enclosure to be coupled to the cathode within the enclosure, and including cooling liquid lines extending through the support rod to the cathode to provide cooling liquid to the cathode to allow the cathode to be maintained at a desired operating temperature.

23. Apparatus for forming carbon nanotubes comprising:
   (a) an enclosure enclosing a space which may be filled with an inert gas;
   (b) a carbon anode mounted in the enclosure;
   (c) a cathode mounted in the enclosure, the cathode and anode having faces that may be spaced from each other by a gap;
   (d) an electrical power supply connected to the anode and cathode to apply a voltage thereto to establish and maintain an electrical arc between the anode and cathode; and
   (e) a vibrational driver mechanically coupled to the cathode to selectively provide a stress pulse to the cathode of an amplitude sufficient to dislodge carbon material deposited on the face of the cathode.

24. The apparatus of claim 23 wherein the vibrational driver includes a piezoelectric drive at a position outside of the enclosure coupled to a support rod which extends through a wall of the enclosure and is coupled to the cathode within the enclosure, the piezoelectric drive supplying a stress pulse through the support rod to the cathode.

* * * * *